No. 876,941. PATENTED JAN. 21, 1908.
A. F. CALLISON.
LOADING AND UNLOADING MECHANISM.
APPLICATION FILED OCT. 29, 1907.

3 SHEETS—SHEET 1.

Witnesses
Jas. F. McCathran
B. G. Fater

A. F. Callison, Inventor
By C. G. Biggs
Attorney

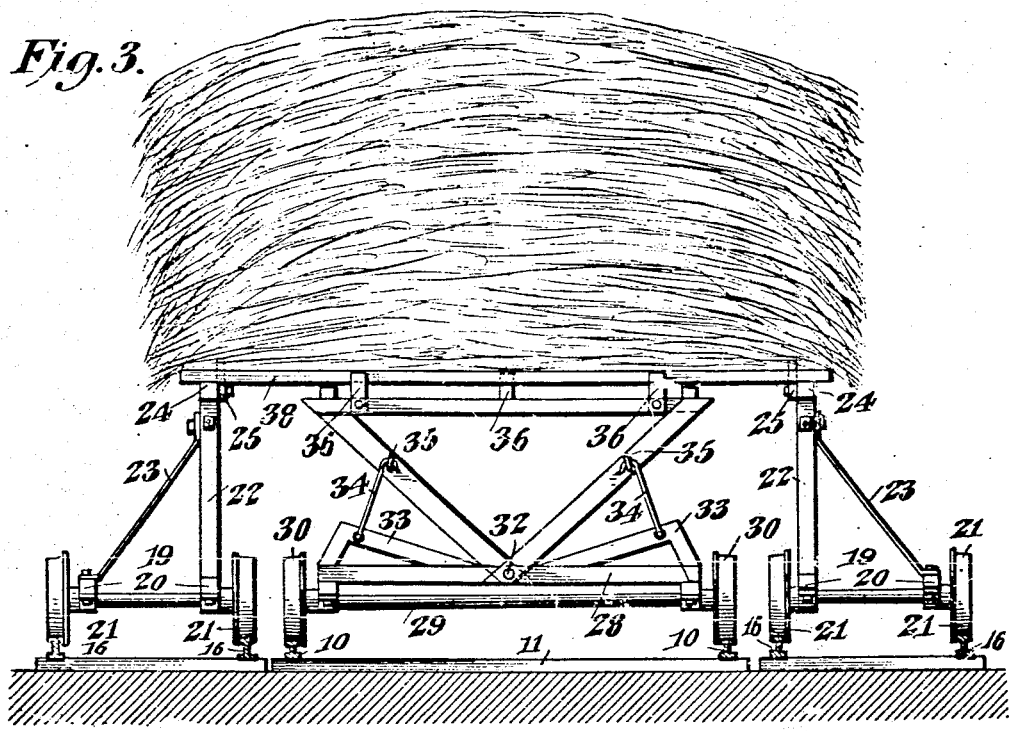
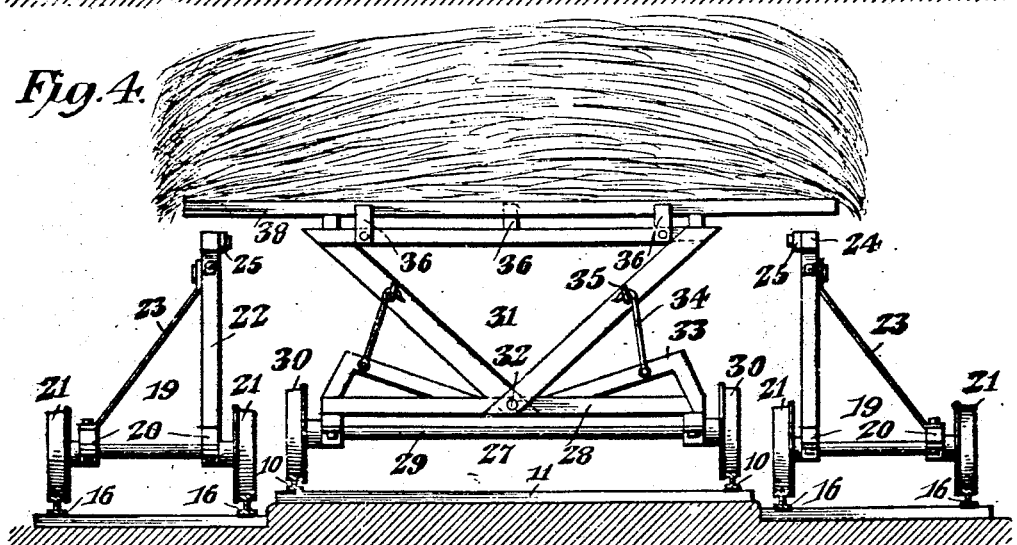

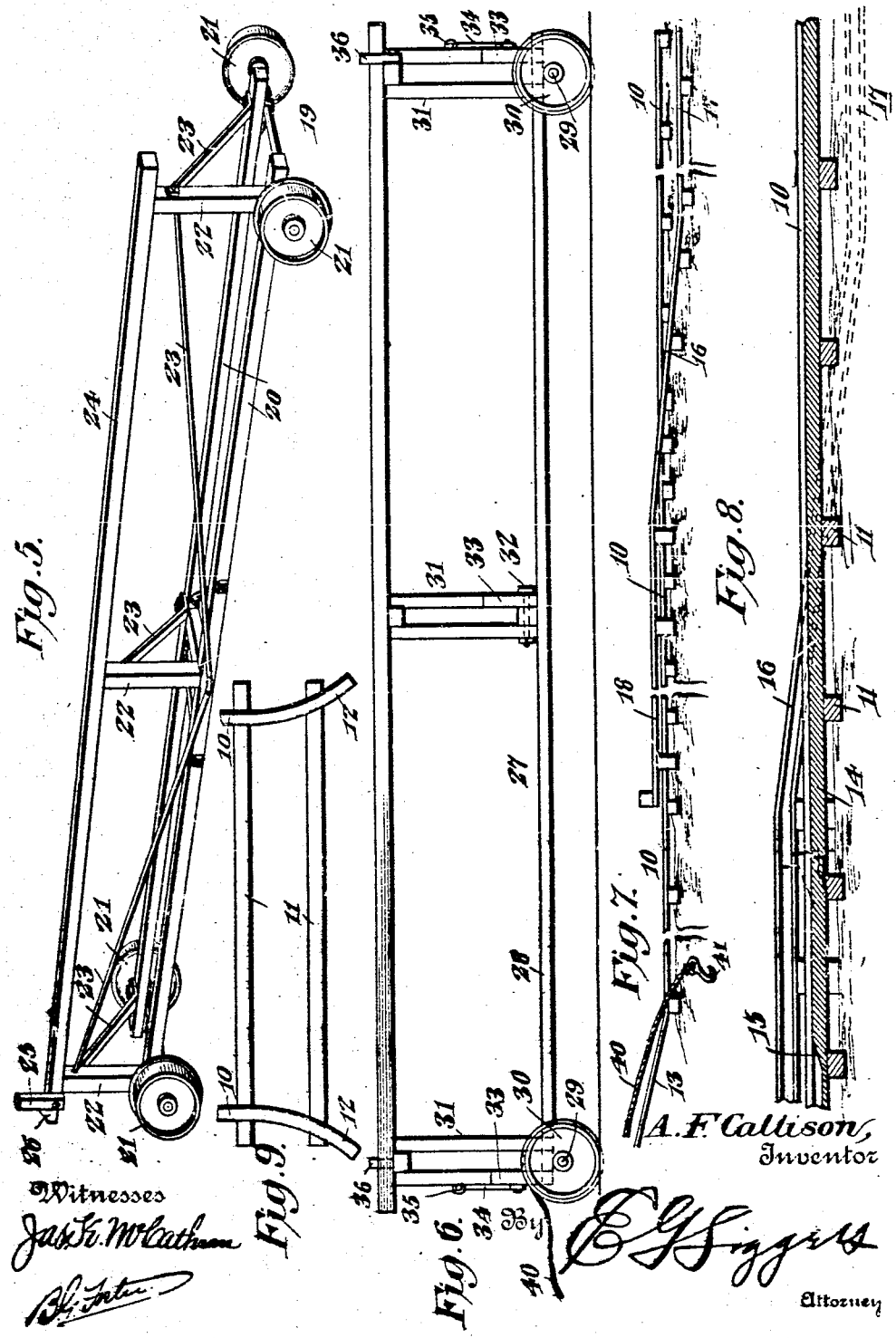

UNITED STATES PATENT OFFICE.

ABNER F. CALLISON, OF GAGE, OKLAHOMA.

LOADING AND UNLOADING MECHANISM.

No. 876,941.  Specification of Letters Patent.  Patented Jan. 21, 1908.

Application filed October 29, 1907. Serial No. 399,635.

*To all whom it may concern:*

Be it known that I, ABNER F. CALLISON, a citizen of the United States, residing at Gage, in the county of Woodward, Oklahoma, have invented a new and useful Loading and Unloading Mechanism, of which the following is a specification.

This invention relates more particularly to means for unloading and stacking grain, hay, and the like, though not necessarily limited to this use, and being also capable of employment for loading purposes.

The principal object of the present invention is to provide novel means of a simple nature, whereby loads can be transferred bodily from a vehicle and carried to and discharged at a place of deposit or storage with comparatively little work or delay so that the time and labor now ordinarily employed in unloading the vehicle is saved.

The preferred form of construction is illustrated in the accompanying drawings, wherein:—

Figure 1:
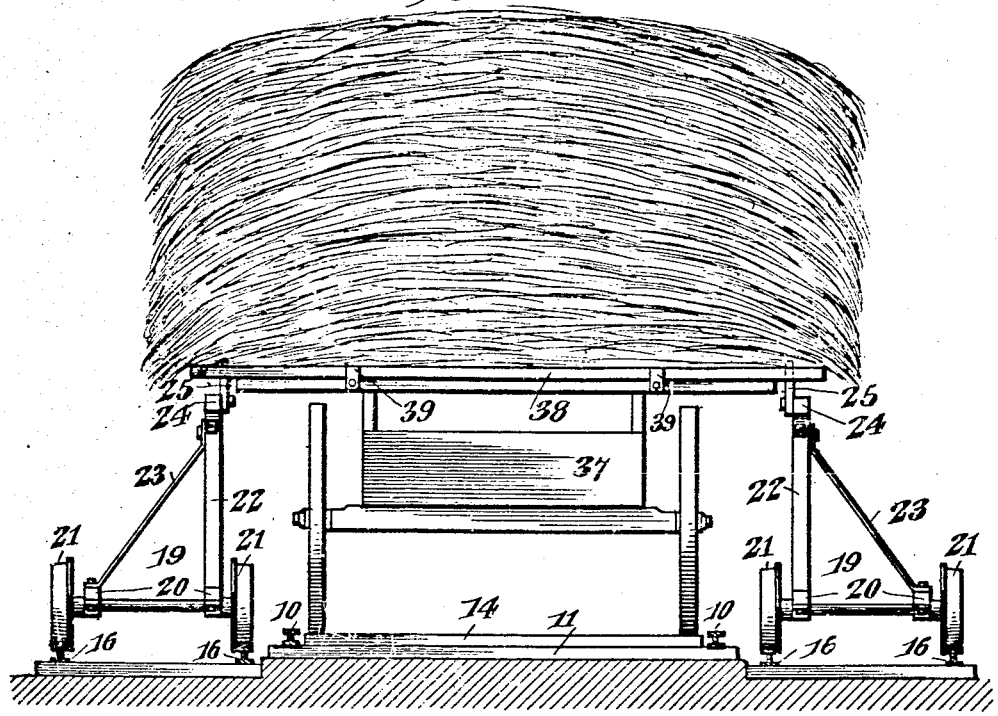
Figure 2:
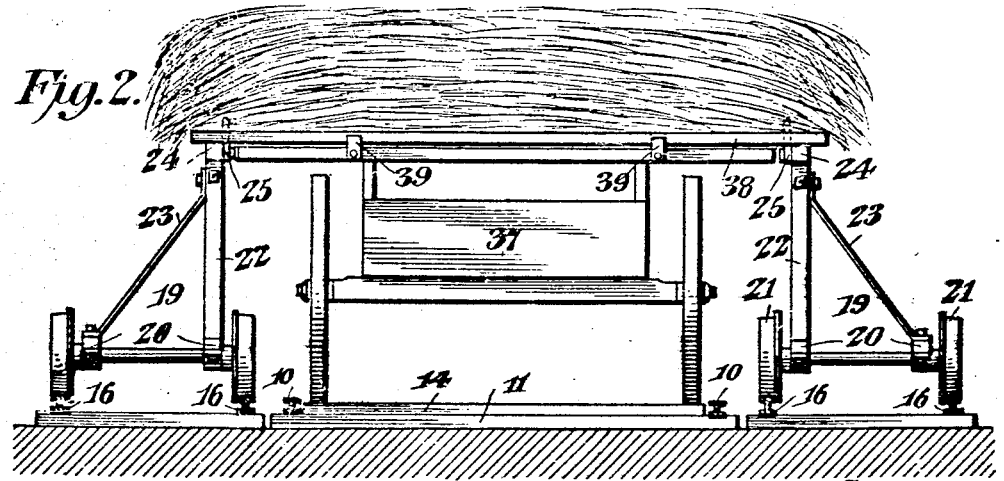

Figure 1 is a rear elevation of the mechanism showing a vehicle to be unloaded in place therein and with the load still on the vehicle. Fig. 2 is a similar view but illustrating the load transferred to the transferring trucks. Fig. 3 is a view illustrating the receiving truck in position but with the load still on the transferring trucks. Fig. 4 is a view illustrating the receiving truck having the load thereon. Fig. 5 is a perspective view of one of the transfer trucks. Fig. 6 is a side elevation of the receiving truck. Fig. 7 is a side elevation of the track mechanism, portions thereof being broken away. Fig. 8 is a longitudinal sectional view on an enlarged scale through a portion of the track mechanism. Fig. 9 is a plan view showing the receiving end of the central track.

Similar reference numerals designate corresponding parts in all the figures of the drawings.

In the embodiment illustrated, a central track is employed for a receiving truck, this track comprising suitable rails 10 mounted on sleepers or ties 11 and having their ends outturned, as shown at 12 in Fig. 9. This track is continued to the place of storage, whether in a barn or in a field, and is elevated by an incline as shown at 13 in Fig. 7 to said storage point. Between the rails 10 is a driveway or trackway 14, which, as illustrated in Fig. 8, has a depressed portion 15. On opposite sides of the trackway and rails 10 are located other tracks 16 preferably of narrower gage than the central track, the outer portions of the track 16 being lower than the central track, as shown at 17 in Fig. 7, the inner portions being raised above said central track, as illustrated at 18. Transfer trucks 19 are movable on the tracks 16 and comprise suitable base frames 20 mounted on wheels 21 that run on said tracks 16. Rising from the base frames are standards 22, braced as illustrated at 23 and carrying at their upper ends supporting beams 24 disposed longitudinally of the various tracks. Fingers 25 are pivotally mounted on the inner or front ends of the transfer trucks, and are capable of swinging to upright positions or to horizontal positions, as will be evident by a comparison of Figs. 4 and 5. When in upright position, they engage suitable abutments 26, as shown in Fig. 5.

A receiving truck 27 operates on the central track 10—13, and comprises a base frame 28 having axles 29 which carry wheels 30 operating on the rails 10. A dumping frame 31 is pivotally mounted, as shown at 32 on the base, the axis of its movement being longitudinally of the truck. The dumping frame tapers toward its pivot axis, and its swinging movement in either direction is limited by stops 33. It is normally held against swinging movement and with the upper portion thereof in horizontal position by hooks 34 pivoted on the base frame and detachably engaging in eyes 35 carried by the dumping frame. Fingers or latches 36 are pivotally mounted on the ends of the dumping frame, and are movable to upstanding positions, as illustrated in Figs. 3 and 4.

A vehicle 37 of any well known character may be employed for transporting the load from the field to the mechanism, this vehicle operating on the central trackway 14 between the rails 10. Mounted thereon is a removable rack 38 which extends beyond opposite sides of the vehicle, as illustrated in Figs. 1 and 2 so that its opposite margins will be located over the supporting bars 24 of the transfer trucks. The rear end of the vehicle has upstanding projections 39 thereon that normally engage the rear end of the removable rack, while the front end of said rack is arranged to engage the upstanding fingers 25 of the transfer trucks when said trucks are in their lowermost positions on the depressed portions of the tracks 17.

The operation of the mechanism is as follows. The transfer trucks 19 are placed on the lowermost portions 17 of the tracks 16 and the fingers 25 are elevated. The vehicle with the load thereon is then driven upon the trackway 14, and as it moves along the same, the front end of the rack 38, striking the upstanding fingers 25, will cause the transfer trucks to move along with said vehicle. Consequently the trucks will move on to the elevated portions 18 of the side tracks 16, and as a result, the supporting beams or bars 24 will engage the under side of the removable rack 38, and elevate the same with the load thereon off from the vehicle. Inasmuch as the projections 39 still engage the rack, however, all the parts will move together until the rear end of the vehicle reaches the depression 15 in the trackway 14, shown in Fig. 8, whereupon the vehicle will drop low enough to permit the projections 39 to pass under the rack. The vehicle is then driven on until the rack is cleared, and is then turned to one side or the other. The load is now supported on the transfer trucks. The receiving truck, which is at the elevated end of the central track 10—13, is allowed to descend, and passes freely under the rack 38 to the position shown in Fig. 3, whereupon the fingers or latches 36 are turned upwardly. The movement of the receiving truck is then continued and the transfer trucks moved with it, being thus returned to the lowermost portions 17 of the tracks 16. As a result, the rack 38 will rest upon the dumping frame 31 of the receiving trucks, as illustrated in Fig. 4. A cable as 40 is connected to the receiving truck and passes around a suitable sheave (not shown) at the elevated end of the track 10—13. The land end of this cable 40 is provided with suitable means, as for instance, a hook 41 whereby it can be attached to the rear end of the vehicle. The fingers or latches 36 of the receiving truck are now turned downwardly and the vehicle is driven off. As a result, the receiving truck will be drawn by said vehicle and the connecting cable 40 along the track 10—13 to the elevated end thereof, where the hooks 34 are disengaged from the eyes 35 and the load is dumped. This leaves the mechanism in position for another load. The empty rack now on the receiving truck is placed upon the next unloaded vehicle so that but one additional rack is needed. With this structure therefore, the load is taken bodily from the vehicle, carried bodily to the place of storage, and there bodily deposited. There is no loss of time, nor any necessity for pitching the load from said vehicle. Moreover the teams can be continuously used in hauling and if the mechanism is properly operated, they hardly have to come to a standstill during the unloading operation.

From the foregoing, it is thought that the construction, operation, and many advantages of the herein described invention will be apparent to those skilled in the art without further description, and it will be understood that various changes in the size, proportion, and minor details of construction may be resorted to without departing from the spirit or sacrificing any of the advantages of the invention.

Having thus fully described my invention, what I claim as new, and desire to secure by Letters Patent, is:—

1. In loading and unloading mechanism, the combination with a vehicle, of a removable rack mounted thereon and projecting beyond the opposite sides of the vehicle, a trackway for said vehicle, other trackways located on opposite sides of the vehicle trackway, said latter trackways having portions located at different elevations with respect to each other, and separate transfer trucks movable on the latter trackways and having their upper portions located beneath and movable into engagement with the opposite sides of the rack to elevate the same from the vehicle upon the movement of the vehicles and trucks along their respective trackways.

2. In loading and unloading mechanism, the combination with a vehicle, of a removable rack mounted thereon, a trackway for said vehicle, other trackways located on opposite sides of the vehicle trackway, said various trackways having portions located at different elevations with respect to each other, separate transfer trucks movable on the latter trackways and moving into engagement with the opposite portions of the rack to elevate the same from the vehicle upon the movement of said vehicle and trucks along their respective trackways, and devices mounted on the trucks and movable to upstanding positions in the path of movement of the rack.

3. In loading and unloading mechanism, the combination with a vehicle, of a removable rack mounted thereon, a trackway for said vehicle, other trackways located on opposite sides of the vehicle trackway, said various trackways having portions located at different elevations with respect to each other, separate transfer trucks movable on the latter trackways and moving into engagement with the opposite portions of the rack to elevate the same from the vehicle upon the movement of said vehicle and trucks along their respective trackways, and fingers pivotally mounted on the front ends of the trucks and movable to upstanding positions in the path of movement of the rack.

4. In loading and unloading mechanism, the combination with a vehicle, of a removable rack mounted thereon and projecting beyond the opposite sides of the vehicle, a central trackway for said vehicle, and tracks located on opposite sides of the trackway, said tracks having portions located lower, and other portions located higher than the trackway, separate transfer trucks movable on the tracks and having their upper portions located beneath and movable into engagement with the opposite sides of the rack to elevate the same from the vehicle upon the movement of the vehicle and trucks, means mounted on the vehicle and detachably engaging the rack to insure their simultaneous movement, and fingers carried by the trucks and detachably engaged by the rack to effect the movement of said trucks with the rack and vehicle.

5. In loading and unloading mechanism, the combination with a vehicle, of a removable rack mounted thereon and projecting beyond the opposite sides of the vehicle, a trackway for said vehicle, other trackways located on opposite sides of the vehicle trackway, said latter trackways having portions located at different elevations with respect to each other, separate transfer trucks movable on the latter trackways and having their upper portions located beneath and movable into engagement with the opposite sides of the rack to elevate the same from the vehicle upon the movement of the vehicle and trucks along their respective trackways, and devices carried by the vehicle and detachably engaging the rack to insure its forward movement with a vehicle during the elevation of said rack, said first mentioned trackway having a depressed portion to carry the devices out of coaction with the rack.

6. In loading and unloading mechanism, the combination with spaced movable transfer trucks, of a vehicle movable between the same, a receiving truck also movable between the transfer trucks, and a rack that is movable from one to the other, said vehicle and trucks being relatively movable to different elevations to transfer the rack from one to the other.

7. In loading and unloading mechanism, the combination with spaced movable transfer trucks, of a vehicle movable between the same, a rack transferable from the vehicle to the trucks, means for effecting the elevation of the trucks with relation to the vehicle to transfer the rack from the latter to the former, a receiving truck movable between the transfer trucks when the latter are in said elevated position, and means for lowering the transfer trucks to deposit the racks on the receiving truck.

8. In loading and unloading mechanism, the combination with a trackway for a vehicle, of rails for a receiving truck on opposite sides of the trackway, tracks located on opposite sides of the trackway and rails, a vehicle that moves on the trackway between the rails, transfer trucks movable on the tracks on opposite sides of said trackway, a rack removable from the vehicle and transferable to the trucks, and a receiving truck movable on the rails and arranged to receive the rack from the transfer trucks.

9. In loading and unloading mechanism, the combination with spaced rails for a receiving truck, of a trackway located between the rails and having a depression, tracks located on opposite sides of the trackway and rails, certain portions of said tracks being lower than the rails and trackway, other portions being higher than the same, a vehicle movable on the trackway, transfer trucks mounted on the tracks, a rack removably mounted on the vehicle and transferable to the trucks, detachable connections between the vehicle and rack to effect their simultaneous movements, detachable connections between the rack and trucks to effect their simultaneous movements and cause the trucks to move under the elevated portions of the tracks to elevate the rack from the vehicle, said detachable connections between the vehicle and rack freeing said rack upon the movement of said vehicle on to the depressed portion of the trackway, and a receiving track movable on the rails and having means for engaging with the rack to cause the return of the trucks to the lower portions of the tracks and the consequent transfer of the rack to said receiving truck.

10. In loading and unloading mechanism, the combination with spaced movable transfer trucks, of a receiving truck movable between the same and comprising a wheeled base, and a dumping frame pivotally mounted on the base.

11. In loading and unloading mechanism, the combination with spaced tracks, of a track located therebetween, movable transfer trucks mounted on the spaced tracks, and a receiving truck movable between the transfer trucks and comprising a base, wheels carried by the base and operating on the tracks, a dumping frame pivotally mounted on the base and having its axis of movement disposed longitudinally of said base, and means for securing the frame against its swinging movement.

In testimony, that I claim the foregoing as my own, I have hereto affixed my signature in the presence of two witnesses.

ABNER F. CALLISON.

Witnesses:
C. T. CALLISON,
G. E. WARD.